United States Patent [19]

Mozurkewich

[11] Patent Number: 5,461,918
[45] Date of Patent: Oct. 31, 1995

[54] VIBRATING BEAM ACCELEROMETER

[75] Inventor: George Mozurkewich, Plymouth, Mich.

[73] Assignee: Ford Motor Company, Dearborn, Mich.

[21] Appl. No.: 1,690

[22] Filed: Apr. 26, 1993

[51] Int. Cl.$^6$ .................................................. G01P 15/08
[52] U.S. Cl. ........................... 73/514.26; 73/517 AV
[58] Field of Search .................... 73/517 AV, 517 A, 73/DIG. 1, 862.59, 505, 517 R

[56] References Cited

U.S. PATENT DOCUMENTS

| | | | |
|---|---|---|---|
| 3,146,057 | 8/1964 | Rona | 346/108 |
| 3,292,437 | 12/1966 | Mathey et al. | 73/517 AV |
| 3,465,597 | 9/1969 | Paros et al. | 73/517 AV |
| 3,541,866 | 11/1970 | Mathey et al. | 73/517 AV |
| 4,091,679 | 5/1978 | Furusawa et al. | 73/497 |
| 4,155,257 | 5/1979 | Wittke | 73/497 |
| 4,197,478 | 4/1980 | Silvus | 350/316 |
| 4,221,131 | 9/1980 | Albert | 73/517 AV |
| 4,479,385 | 10/1984 | Koehler | 73/517 AV |
| 4,510,802 | 4/1985 | Peters | 73/505 |
| 4,512,192 | 4/1985 | Peters | 73/505 |
| 4,538,461 | 9/1985 | Juptner et al. | 73/505 |
| 4,592,233 | 6/1986 | Peters | 73/510 |
| 4,628,735 | 12/1986 | Kirkpatrick | 73/517 AV |
| 4,712,427 | 12/1987 | Peters | 73/517 AV |
| 4,739,660 | 4/1988 | Fima | 73/517 AV |
| 4,744,248 | 5/1988 | Stewart | 73/505 |
| 4,744,249 | 5/1988 | Stewart | 73/505 |
| 4,750,364 | 6/1988 | Kawamura et al. | 73/517 AV X |
| 4,755,051 | 7/1988 | Cahill et al. | 356/350 |
| 4,761,743 | 8/1988 | Wittke | 364/484 |
| 4,804,875 | 2/1989 | Albert | 73/517 AV |
| 4,805,456 | 2/1989 | Howe et al. | 73/517 AV |
| 4,851,080 | 7/1989 | Howe et al. | 156/647 |
| 4,900,918 | 2/1990 | Killian | 250/227 |
| 4,980,598 | 12/1990 | Albert | 310/325 |

OTHER PUBLICATIONS

D. W. Satchell, et al., *A Thermally–Excited Silicon Accelerometer*, Sensors and Actuators, 17 (1989) 241–245.
William C. Albert, *Vibrating Quartz Crystal Beam Accelerometer*, U.S.A. 28 (1982) 33–44.
M. A. Meldrum, *Application of Vibrating Beam Technology To Digital Acceleration Measurement*, Sensors and Actuactors, A21–A23 (1990) 377–380.
S. C. Chang et al., *Resonant–bridge Two–axis Microaccelerometer*, Sensors and Actuators, A21–A23 (1990) 342–345.

Primary Examiner—Richard Chilcot
Assistant Examiner—Joseph L. Felber
Attorney, Agent, or Firm—Allan J. Lippa; Roger L. May

[57] ABSTRACT

A device for measuring acceleration based on the shift in resonant frequency of a vibrating cantilevered beam in response to an acceleration force having a component along its major axis is disclosed. Such accelerometers may be manufactured by micromachining in silicon, and comprise one or more beams, each provided with drive means for keeping the beam in vibration at the resonant frequency, and detection means for sensing changes in the resonant frequency. The sensitivity of accelerometers according to the invention is determined by the length of the cantilevered beam, a factor easily controlled during manufacture, and by the resonant frequency of the beam, which is continuously measured in use. Accelerometers constructed according to the invention are self-calibrating, self-testing and susceptible to large-scale batch manufacture.

15 Claims, 4 Drawing Sheets

VIBRATING BEAM ACCELEROMETER

BACKGROUND OF THE INVENTION

1. Field of the Invention

This invention relates to novel devices for measuring acceleration.

2. Background of the Invention

Accelerometers have many useful applications. For example, in the motor vehicle industry, accelerometers may be employed effectively to control systems, such as air-bag deployment, anti-skid braking and active suspension systems, which are designed to respond to changes in vehicle acceleration.

Deflection-based accelerometers have been developed to measure changes in acceleration. Such devices, which typically include a proof mass supported by an elastic member, measure the deflection of an object subjected to an acceleration force. The magnitude of the deflection depends on the size of the proof mass, the stiffness of the elastic member and various dimensions of both, in addition to the magnitude of the acceleration itself.

Accordingly, the sensitivity of such devices depends strongly on several typically small, process-variable dimensions. The need for accuracy in measuring such dimensions adds to the cost and complexity of their manufacture. In addition, the calibration factor for each accelerometer must be determined individually, further increasing the expense of manufacturing and deploying such devices.

Moreover, measurement of the deflection in such devices may be difficult. If the accelerometer employs a capacitor for this purpose, the thickness of the gap between the object and a fixed electrode, typically on the order of several microns, must be known. Other methods of measuring deflection have similar uncertainties. Hence the accuracy with which the electrical output signal of the device can be correlated to the deflection, and thus the acceleration, could advantageously be increased.

Accordingly, a need has persisted for an accelerometer sufficiently sensitive to changes in acceleration that is susceptible to batch production on an economical basis.

Frequency-type accelerometers have also been disclosed previously. For example, U.S. Pat. No. 4,805,456 describes a device with two vibrating members oppositely disposed with respect to a proof mass. Such devices compensate for temperature changes in the operating environment, as the frequency of vibration of the members changes oppositely in response to acceleration, but in tandem in response to changes in temperature.

However, because the proof mass of the disclosed device is a separate object, the frequency is determined both by the dimensions of the proof mass and by the dimensions of the vibrating members. Again, the small size of many of these dimensions makes measurement of the various elements and calibration of the device difficult. In addition, manufacture or assembly of devices comprising multiple elements may be difficult. Accordingly, the need has remained for an accelerometer susceptible to ease of manufacture, calibration and use.

SUMMARY OF THE INVENTION

The present invention provides an accelerometer that measures acceleration based on the shift in resonant frequency of a cantilevered vibrating beam subjected to an acceleration parallel to its major axis. By combining each vibrating member and proof mass into a single element, embodiments of the present invention overcome prior limitations.

An accelerometer constructed according to the present invention comprises a cantilevered beam, means to excite the beam and means to detect resonant flexural vibrations of the beam. A component of acceleration along the major axis of the beam will cause the frequency of the resonant flexural vibrations to change. When the component of acceleration is in the direction of the vector from the clamped end of the beam along the major axis, the resonant frequency decreases. When the direction of the acceleration component is along the major axis toward the clamped end, the resonant frequency increases. The magnitude of the change in the resonant frequency may be measured by a signal processing circuit whose output may be used to calculate the component of acceleration along the major axis of the beam.

A preferred accelerometer according to the present invention comprises a substrate, a base, one or more pairs of cantilevered beams, means for driving the beams in vibration at a resonant frequency, and means for detecting changes in the resonant frequency of each beam. Each of the cantilevered beams has a fixed end and a free end, and the beams within each pair of cantilevered beams are aligned along a common major axis or along parallel major axes. In either case, the two vibrating beams are arranged such that the major axes of the two beams extend in opposite directions away from their respective fixed points. Each beam is excited separately and the frequency of the resonant vibration of each beam is detected separately. A component of acceleration along the common or parallel axes of the two beams will increase the resonant frequency of one beam and decrease the resonant frequency of the other. The signal processing circuit includes a frequency measuring circuit for each beam and a circuit for determining the difference between the changes in frequencies of the two beams.

A principal aspect of the accelerometer of the present invention is that its sensitivity depends only on the length of the beam, a relatively large dimension that is fairly easily controlled in the production process, and the resonant frequency, an easily determined variable. Because the sensitivity does not depend directly on the width or thickness of the beam, these small and difficult to precisely control dimensions do not affect the calibration of the device.

Another aspect of preferred embodiments of the invention is that extraneous effects, such as changes in the temperature of the operating environment of the device, will affect the resonant frequencies of both beams in the same direction, causing virtually no change in the difference between the changes in the two frequencies, and thus no change in the detected acceleration.

Accelerometers constructed according to the present invention may also be combined to provide for measurement of components of acceleration along two or three orthogonal axes. For example, two pairs of cantilevered beams may be disposed upon a common base. In addition, multiple accelerometers of the present invention may be mounted separately but orthogonally to detect components of acceleration in two or three dimensions.

A further aspect of accelerometers of the present invention is that they are self-calibrating and self-testing.

Additional aspects of the present invention will be apparent from the following detailed description of certain preferred embodiments of the invention.

DETAILED DESCRIPTION OF CERTAIN PREFERRED EMBODIMENTS

Figure 1:
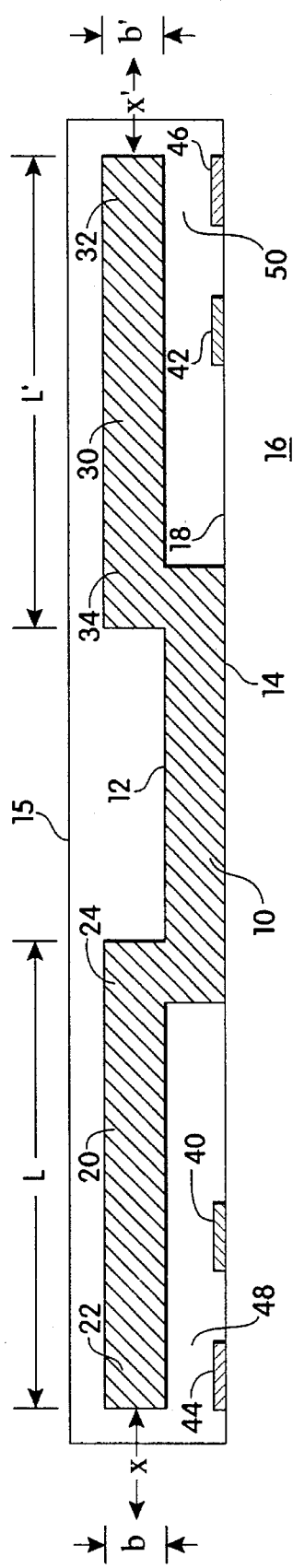
FIG. 1 is a side-sectional view of the preferred embodiment of FIG. 2, taken through line 1—1 of FIG. 2.

Applicant does not intend the scope of his invention to be limited by theory, and the following analysis is intended to illustrate and explain the operation of embodiments of the invention.

An acceleration force along the major axis of a vibrating beam causes a change in the restoring force felt by the bent beam, and thus in the resonant frequency of the vibrating beam. The change in resonant frequency of a vibrating cantilevered beam may be obtained by solving the equation of motion for flexural vibrations of the beam in a reference frame accelerated, with respect to an inertial frame, parallel to the axis of the beam. The transformation from the inertial frame into the reference frame of the beam introduces an equivalent gravitational field g which is equal in magnitude, but opposite in direction, to the acceleration a of the reference frame.

When such a cantilevered beam of length L is bent, the x coordinate of a given position on the beam changes, as defined by the equation $$\Delta x(x) = -\frac{1}{2} \int_0^x \left( \frac{\partial u}{\partial x} \right)^2 dx \quad \text{(Eq. 1)}$$

where x=0 at the fixed end of the beam, x=L at the free end, and u(x) denotes the transverse displacement of the beam.

The corresponding change in gravitational potential energy is $$V_g = -\rho g w b \int_0^L \Delta x(x) dx \quad \text{(Eq. 2)}$$

where $\rho$ is the density of the beam, w is the width of beam, and b is the thickness of the beam. The Lagrangian density of the bent beam in the gravitational field is $$= \frac{1}{2} \rho \left( \frac{\partial u}{\partial t} \right)^2 - \frac{1}{24} E b^2 \left( \frac{\partial^2 u}{\partial x^2} \right)^2 - \quad \text{(Eq. 3)}$$

$$\frac{1}{2} \rho g \int_0^x \left( \frac{\partial u}{\partial x} \right)^2 dx$$

where E is the modulus of elasticity. The terms on the right-hand side represent kinetic energy, elastic energy, and gravitational energy, respectively. The kinetic and elastic terms are well known. Applying the techniques of the calculus of variations, as described in R. Weinstock, *Calculus of Variations*, pages 57–60 (McGraw-Hill, New York, 1952), yields the equation of motion $$\frac{1}{12} E b^2 \frac{\partial^4 u}{\partial x^4} + \rho g \left( x \frac{\partial^2 u}{\partial x^2} + \frac{\partial u}{\partial x} \right) = -\rho \frac{\partial^2 u}{\partial t^2} \quad \text{(Eq. 4)}$$

Upon separating variables in the harmonic approximation, the right-hand side is replaced by $4\pi^2 f^2 \rho u$.

Where g=0, the solution of Eq. 4 is well known. (P. M. Morse, *Vibration and Sound*, American Institute of Physics, 1986, pages 158–159) The resonant frequency of the fundamental mode is $$f_1 = 0.1616 \frac{b}{L^2} \sqrt{\frac{E}{\rho}} \quad \text{(Eq. 5)}$$

with the corresponding eigenfunction $$u(x) = 0.707 \, [\cosh(0.597\pi x/L) - \cos(0.597\pi x/L)] - 0.518 \, [\sinh(0.597\pi x/L) - \sin(0.597\pi x/L)] \quad \text{(Eq. 6)}$$

In the equation of motion, the term containing g is small. By the method of Rayleigh-Schödinger perturbation theory, the first-order correction $\Delta f$ to the frequency of the fundamental mode obeys $$2f_1 \Delta f = \frac{g}{2\pi^2 L} \int_0^L u(x) \left[ x \frac{\partial^2 u}{\partial x^2} + \frac{\partial u}{\partial x} \right] dx = \frac{g}{2\pi^2 L} I \quad \text{(Eq. 7)}$$

By numerical integration, I is approximately equal to 1.223. Thus the change of resonant frequency of the fundamental mode is $$\Delta f = -\frac{0.031}{f_1 L} a = -Ra \quad \text{(Eq. 8)}$$

where a=–g. R is defined as the sensitivity factor.

Figure 2:
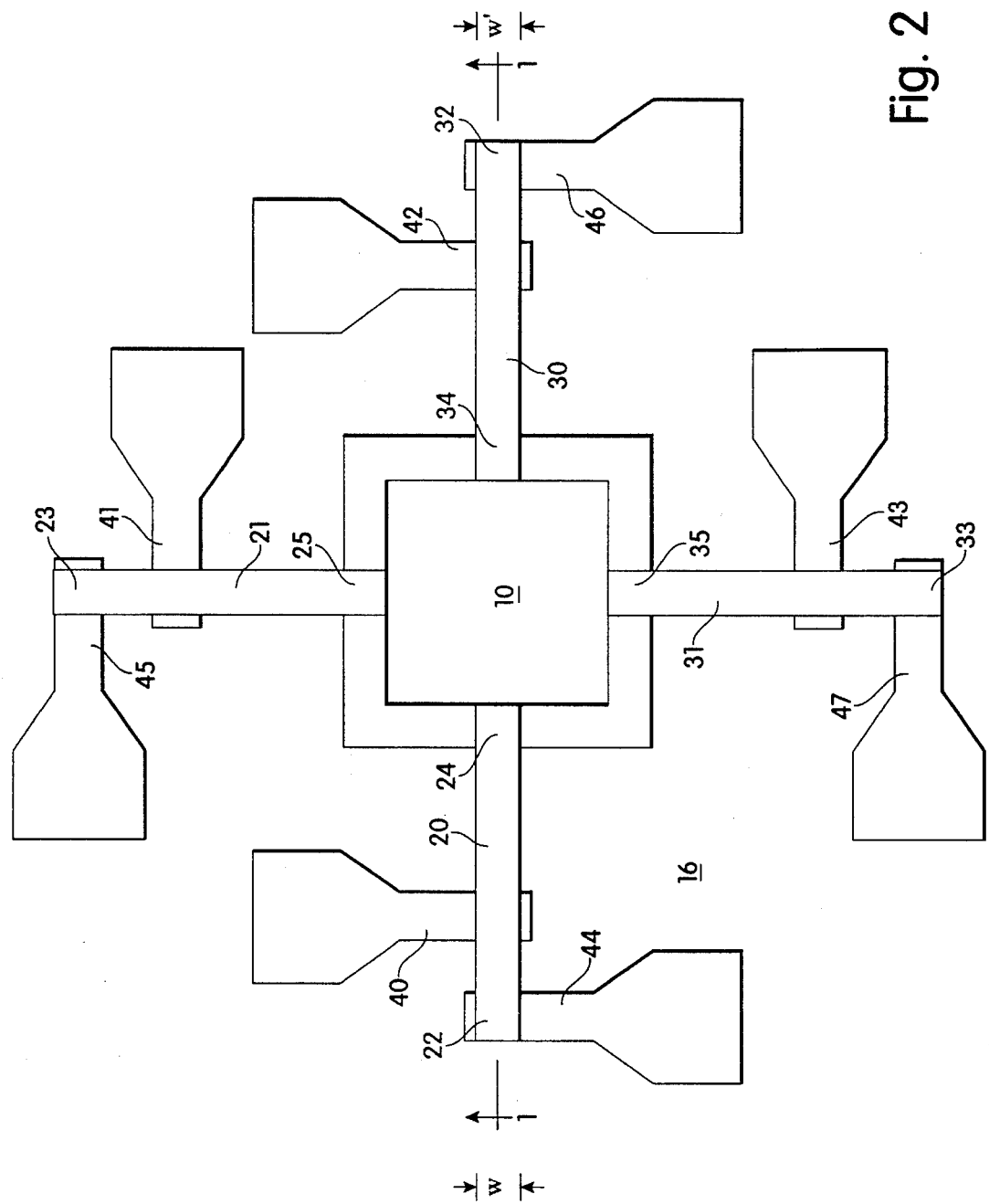
FIG. 2 is a top plan view of a preferred embodiment of the invention.

A preferred embodiment of the present invention is depicted in FIG. 1 and FIG. 2. Referring first to FIG. 1, a base 10, having a top surface 12 and a bottom surface 14, is mounted on a substrate 16 having a top surface 18 such that the bottom surface 14 of the base 10 is joined to the top surface 18 of the substrate 16. The top surface 18 of the substrate 16 defines a plane.

Referring now to FIG. 1 and FIG. 2, beam 20 has a free end 22, a fixed end 24, a length L between the free end 22 and the fixed end 24, a width W, a thickness b, and a major axis x. The fixed end 24 of beam 20 is joined to the top surface 12 of the base 10 such that a substantial portion of the beam 20 is cantilevered beyond the top surface 12 of the base 10 and such that the major axis x of beam 20 lies in a plane essentially parallel to the plane formed by the top surface 18 of the substrate 16. Beam 30 has a free end 32, a fixed end 34, a length L' between the free end 32 and the fixed end 34, a width W', a thickness b' and a major axis x'. Beams 20 and 30 are preferably identical. The fixed end 34 of beam 30 is joined to the top surface 12 of the base 10 such that a substantial portion of the beam 30 is cantilevered beyond the top surface 12 of the base 10 and such that the major axis x' of beam 30 is parallel to, or co-linear with, the major axis x of beam 20.

The base 10 and beams 20, 30 are electrically conductive, and may be constructed separately or integrally. Preferably, base 10 and beams 20, 30 are constructed integrally by micromachining of silicon using techniques well known in the integrated circuit (IC) industry. Such techniques may be advantageously employed to produce a plurality, typically hundreds, of accelerometers according to the present invention from a single silicon wafer by batch production methods.

Substrate 16 is electrically insulated, and may be constructed advantageously from glass or other dielectric material, or from a wafer of silicon, upon the top surface 18 of which an insulating layer has been deposited.

Accelerometers of the present invention may be operated at atmospheric pressure. To minimize damping of the resonances of the beams 20, 30 by air or other ambient gases, the beams are preferably constructed to be as narrow as feasible.

Where detection of small accelerations is desired, the invention is most advantageously practiced in vacuum. Accordingly, preferred embodiments of the invention for such applications further comprise means 15 for hermetically sealing the device.

Referring still to FIG. 1 and FIG. 2, sensing electrodes 40, 42 are disposed upon the top surface 18 of the substrate 16, extending beneath beams 20 and 30, respectively. Drive electrodes 44, 46 are also disposed upon the top surface 18 of the substrate 16, outward of the sensing electrodes 40, 42 with respect to the base 10, and also extending beneath beams 20 and 30, respectively. Sensing electrode 40 and drive electrode 44 are separated from the bottom surface of beam 20 by a gap 48. Sensing electrode 42 and drive electrode 46 are separated from the bottom surface of beam 30 by a gap 50.

Figure 4:
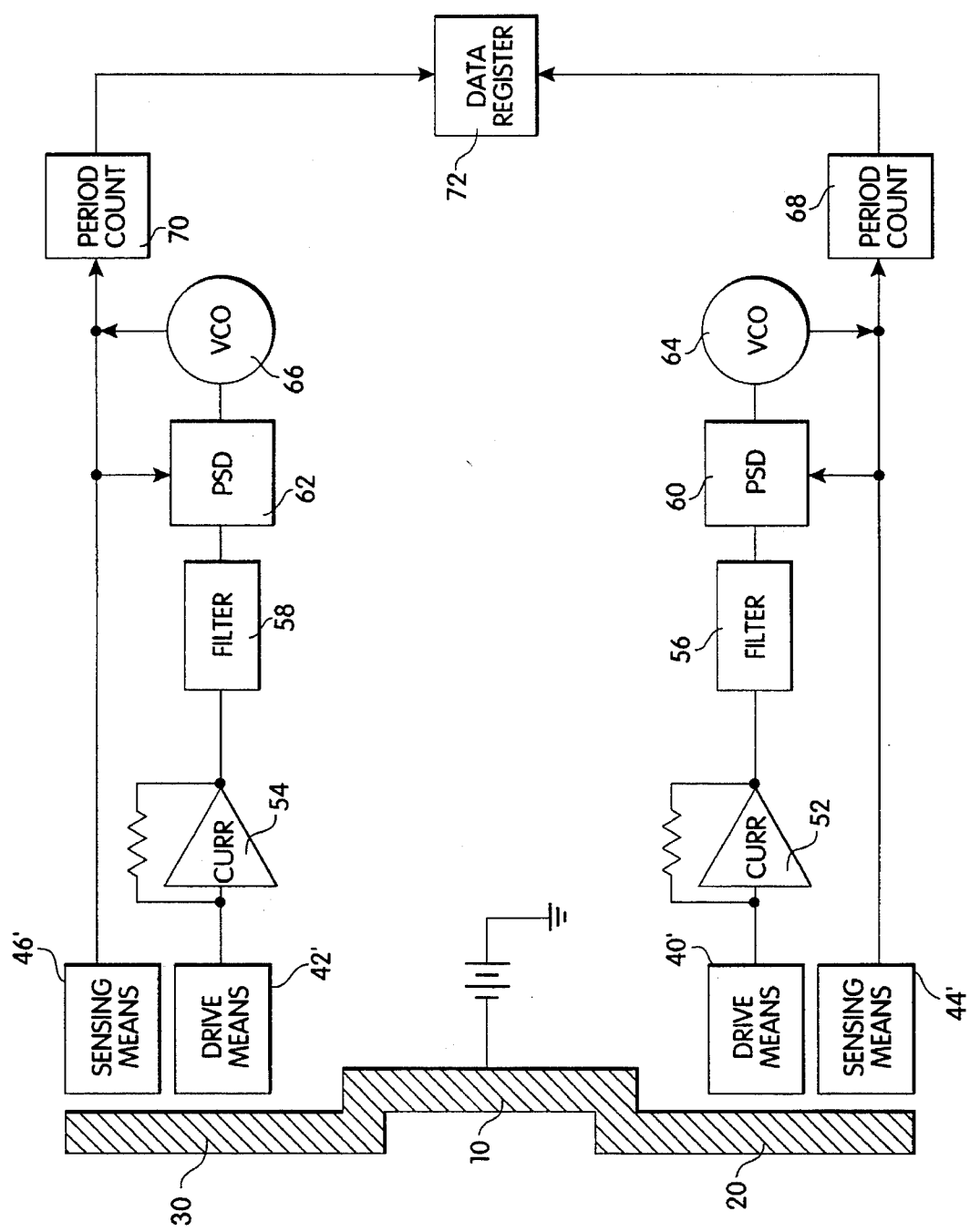
FIG. 4 is a block diagram generically depicting alternate electrical circuitry useful in practicing the invention.

Beams 20, 30 are driven by electrostatic excitation through drive electrodes 44, 46. Appropriate electrical circuitry, such as voltage controlled oscillators (VCO) in phase lock loop (PLL), is employed to maintain the beams 20, 30 at their respective resonant frequencies. Alternate drive means, 40', 42' such as piezoelectric and thermal drive means known in the art, may also be successfully employed in the practice of the invention, as shown in FIG. 4.

The motion of the beams 20, 30 is detected capacitively through the sensing electrodes 40, 42. Alternate sensing means, 44', 46' such as piezoelectric, piezoresistive and optical sensors, may also be employed successfully in the practice of the invention, as shown in FIG. 4.

In a highly preferred embodiment of the present invention, a second pair of cantilevered beams 21, 31, may be disposed orthogonally to beams 20, 30 upon the base 10 in like manner. Like beams 20, 30, both of beams 21, 31 have a free end 23, 33 and a fixed end 25, 35. Drive electrodes 41, 43, corresponding to drive electrodes 40, 42, and sensing electrodes 45, 47, corresponding to sensing electrodes 44, 46, are similarly provided. Again like beams 20, 30, the fixed ends 25, 35 of beams 21, 31 are both joined to the top surface 12 of the base 10 such that a substantial portion of the beams 21, 31 are cantilevered beyond the top surface 12 of the base 10 and such that the major axis of beams 21, 31 lies in a plane essentially parallel to the plane formed by the top surface 18 of the substrate 16.

An acceleration force having a component parallel to the major axes x, x' of beams 20, 30 will cause the resonant frequency of one of the beams to increase and the resonant frequency of the other beam to decrease. From the difference between the changes in resonant frequencies of the beams 20, 30, the direction and magnitude of the acceleration component can be determined.

From Eq. 5 and Eq. 8, it is seen that the sensitivity factor R is proportional to L/b. Accordingly, long, thin beams 20, 30 are preferred in the practice of the invention.

Figure 3:
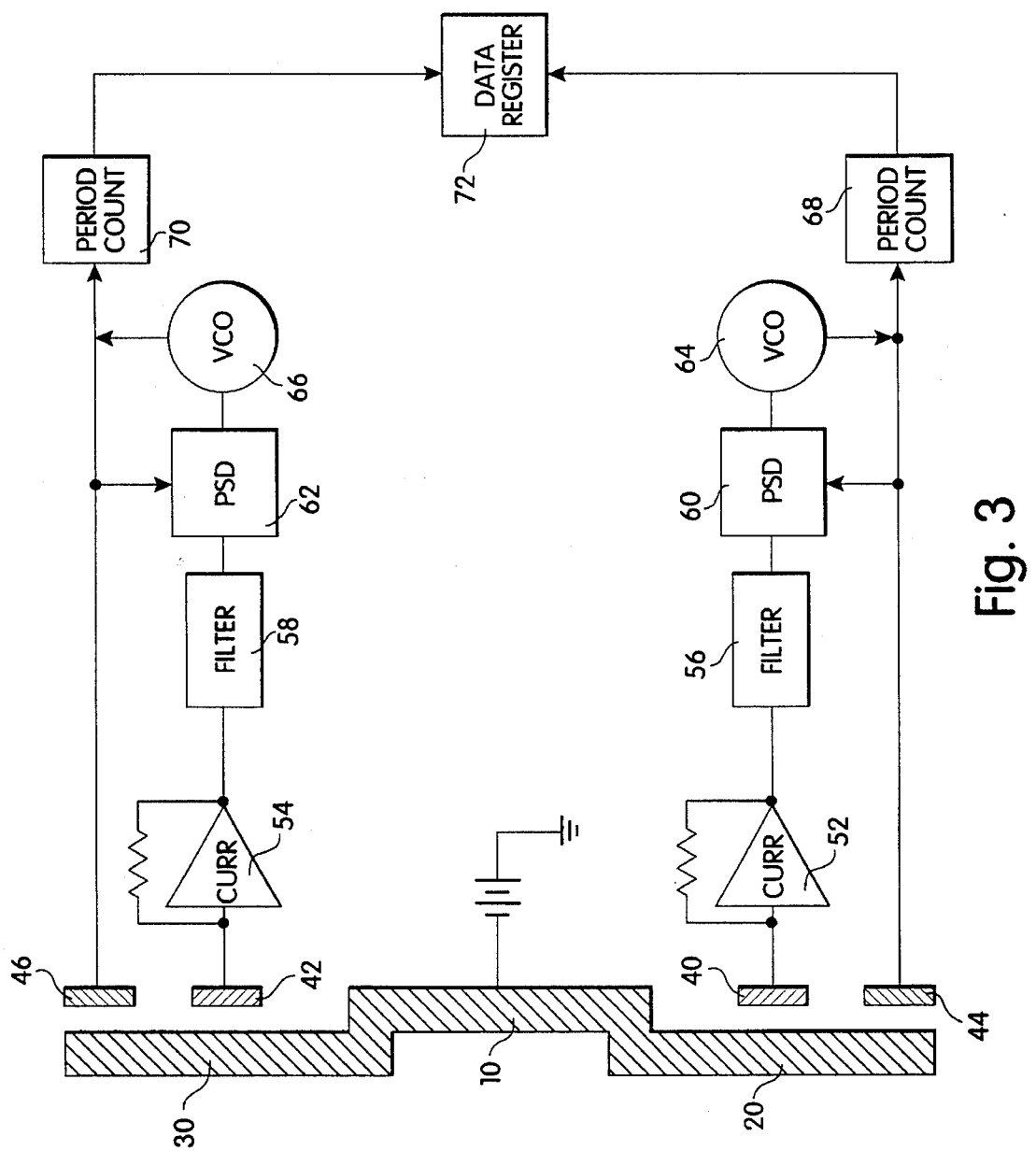
FIG. 3 is a block diagram of electrical circuitry useful in practicing the invention.

Referring now to FIG. 3, an electrostatic drive and capacitive detection system useful in practicing the invention is illustrated. Beams 20, 30 are biased at ±10V so that the driving force is directly proportional to the VCO output. A current amplifier 52, 54 converts the signal from the high-impedance (small capacitance) sensing electrode 40, 42 to a convenient lower impedance level and passes the signal through a filter 56, 58 to a phase-sensitive detector 60, 62. The output of the phase-sensitive detector 60, 62 locks the VCO 64, 66 to the resonant frequency, $f_1$. The durations of a prescribed number of periods of the beams' vibrations are determined individually by the period counters 68, 70. The microprocessor 72 calculates the acceleration from the individual periods of the beams.

Moreover, the magnitude of the capacitively sensed electrical signal increases with decreasing width of the gap 48, 50, with increasing width w, w' of the beam 20, 30, and with increasing width of the sensing electrode 40, 42. Accordingly, the sensitivity of the device is enhanced when the gap 48, 50 is small, the width w, w' of the beam 20, 30 is large, and the width of the sensing electrode 40, 42 is large.

Other circuits can be designed by those of ordinary skill to drive the beams and to detect the frequency of their vibrations. For example, the beams 20, 30 could be employed as electromechanical feedback elements in oscillator circuits.

Selection of the dimensions for embodiments of the invention requires a balance among the desired sensitivity, acceptable minimum measurement time, and the size and robustness required of the device for the particular application. The minimum time required to make a measurement is one period of vibration. Extremely short beams have high resonant frequencies, and thus respond rapidly to changes such as acceleration forces. However, the sensitivity of such beams is very low. Increasing the length of the beam increases sensitivity, but also increases the minimum measurement time due to the lower resonant frequency of such beams. In addition, physical restraints on the length of the beam, and on the thickness required to support increased lengths, may require a sacrifice of sensitivity.

A highly preferred embodiment of the invention, fabricated by micromachining in silicon as previously described, comprises beams 20, 30 of length L=500 μm, width w, w'=10 μm, and thickness b=3 μm, with gaps 48, 50 of 3 μm, and sensing electrodes 40, 42 having widths of 50 μm each.

Alternate beam geometries to those herein disclosed may be successfully used in the practice of the present invention. Provided the thickness of the beams is held constant, the sensitivity factor R will not depend on the thickness. However, a beam of uniform cross-section is preferred because of its ease of manufacture.

Accelerometers constructed according to the present invention are self-calibrating in that their sensitivity depends only on the length L of the beams 20, 30, which can be accurately controlled in the fabrication process, and on the resonant frequency, which is continuously measured. Changes in resonant frequency caused by process variations of dimensions or temperature change of modulus can be calibrated out by a microprocessor.

Accelerometers of the present invention are also self-testing in that a mechanical failure of one or both beams 20, 30, or an electrical failure in the drive or detection systems will cause either total cessation of vibration or a shift of the resonance outside of the expected frequency range. Either event will result in the absence of output from one or both of the current amplifiers 52, 54, which can be signalled electronically by an appropriate indicator lamp or alarm.

The various preferred embodiments of the invention described in detail above are intended only to illustrate the invention. Those skilled in the art will recognize from this disclosure that modifications, additions and substitutions can be made in the various features and elements without departing from the true scope and spirit of the invention. The following claims are intended to cover the true scope and spirit of the invention.

What is claimed is:

1. An accelerometer comprising a substrate, a base mounted on the substrate, one or more pairs of cantilevered beams joined to the base, drive means operatively associated with each beam for driving said beams in vibration at a resonant frequency, and sensing means operatively associated with each beam for detecting changes in the resonant frequency of each beam; wherein each of said cantilevered beams has a fixed end and a free end, and the beams within each pair of cantilevered beams are aligned along a common major axis or along parallel major axes such that the major axes of the two said cantilevered beams within a pair extend in opposite directions away from their respective fixed ends.

2. An accelerometer according to claim 1 further comprising at least two pairs of cantilevered beams, wherein a first pair of said cantilevered beams is disposed orthogonally to a second pair of said cantilevered beams.

3. An accelerometer according to claim 1 wherein the base and each of the cantilevered beams are electrically conductive and the substrate is electrically insulated from said base and from said cantilevered beams.

4. An accelerometer according to claim 1 wherein a substantial portion of the length of each of the cantilevered beams extends beyond the said base.

5. An accelerometer according to claim 1 wherein the means for driving said cantilevered beams in vibration at a resonant frequency comprises separate driving means for each of the said beams.

6. An accelerometer according to claim 1 wherein the means for detecting changes in the said resonant frequency comprises a signal processing circuit including a frequency measuring circuit for each cantilevered beam and a circuit for determining the difference between the changes in resonant frequencies of the beams in each pair of cantilevered beams.

7. An accelerometer according to claim 1 further comprising means for hermetically sealing the cantilevered beams in a vacuum.

8. An accelerometer according to claim 1 wherein the means for driving said beams in vibration at a resonant frequency and the means for detecting changes in the said resonant frequency comprise drive electrodes and associated sensing electrodes disposed upon a top surface of the substrate and extending beneath the cantilevered beams, such that each drive electrode and each associated sensing electrode is separated from one of said beams by a gap.

9. An accelerometer according to claim 1 wherein the means for driving said beams in vibration at a resonant frequency comprises electrostatic, piezoelectric or thermal drive means.

10. An accelerometer according to claim 1 wherein the means for detecting changes in the said resonant frequency comprises capacitive, piezoelectric, piezoresistive or optical sensing means.

11. An accelerometer according to claim 1 wherein the means for driving said beams in vibration at a resonant frequency and the means for detecting changes in the said resonant frequency comprise a signal processing circuit including at least a current amplifier operatively disposed to receive a signal from the sensing means, a phase-sensitive detector operatively disposed to process the output signal from the current amplifier, a voltage controlled oscillator operatively disposed to receive the output of the phase-sensitive detector, a period counter operatively disposed to measure the durations of a prescribed number of periods of a beam's vibrations and a microprocessor operatively disposed to receive the output of the period counter.

12. An accelerometer according to claim 1 wherein the means for driving said beams in vibration at a resonant frequency and the means for detecting changes in the said resonant frequency comprise an oscillator circuit wherein the cantilevered beams function as electromechanical feedback elements.

13. An accelerometer according to claim 1 wherein each cantilevered beam is of essentially uniform cross-section.

14. An accelerometer according to claim 1 wherein each cantilevered beam has a length of approximately 500 μm, a width of approximately 10 μm, and a thickness of approximately 3 μm.

15. An accelerometer comprising a substrate, a base mounted on the substrate, one or more pairs of cantilevered beams, each beam having a fixed end joined to the base and a free end, means disposed about the base for hermetically sealing the cantilevered beams in vacuum; means operatively associated with each beam for driving said beams in vibration at a resonant frequency, and means operatively associated with each beam for detecting changes in the resonant frequency of each beam; wherein the substrate comprises glass or other dielectric material;

the base and each of the cantilevered beams are electrically conductive and the substrate is electrically insulated from said base and from said cantilevered beams;

each of said cantilevered beams has a length of approximately 500 μm, a width of approximately 10 μm, and a thickness of approximately 3 μm, and is of essentially uniform cross-section;

the beams within each pair of cantilevered beams are aligned along a common major axis or along parallel major axes such that the major axes of the two said cantilevered beams within a pair extend in opposite directions away from their respective fixed points; and, the means for driving said beams in vibration at a resonant frequency and the means for detecting changes in the said resonant frequency comprise drive electrodes and associated sensing electrodes disposed upon a top surface of the substrate and extending beneath the cantilevered beams, such that each drive electrode and each associated sensing electrode is separated from a corresponding one of said beams by a gap, a signal processing circuit including at least a current amplifier, a phase-sensitive detector, a voltage controlled oscillator, a period counter and a microprocessor.

* * * * *